United States Patent
Anderson et al.

[15] 3,666,079
[45] May 30, 1972

[54] FRUIT ORIENTER

[72] Inventors: Gerald R. Anderson, Campbell; William C. Wann, Jr., San Jose, both of Calif.

[73] Assignee: FMC Corporation, San Jose, Calif.

[22] Filed: Aug. 21, 1970

[21] Appl. No.: 65,834

[52] U.S. Cl.............................................198/33 AA
[51] Int. Cl.............................................B65g 47/24
[58] Field of Search.............................198/33 AA, 33 AB

[56] References Cited

UNITED STATES PATENTS 2,687,206  8/1954  Carroll......................198/33 AA

Primary Examiner—Edward A. Sroka
Attorney—F. W. Anderson and C. E. Tripp

[57] ABSTRACT

A multiple lane fruit orienter having a conveyor comprising transverse carriers with fruit receiving cups. A rotary finder wheel projects into each cup from below to rotate the fruit and locate the stem cavity. In addition to being rotated the finder wheels are oscillated about a vertical axis to rotate the fruit in varying planes. After the stem cavity has been found the finder wheel is no longer rotated but rapidly oscillated with an increasing frequency and decreasing amplitude so that the major axis of the stem cavity and suture plane of the fruit become aligned with the finder wheel. An additional vibration is imparted to the cam that produces the finder wheel oscillation during the suture plane alignment.

9 Claims, 11 Drawing Figures

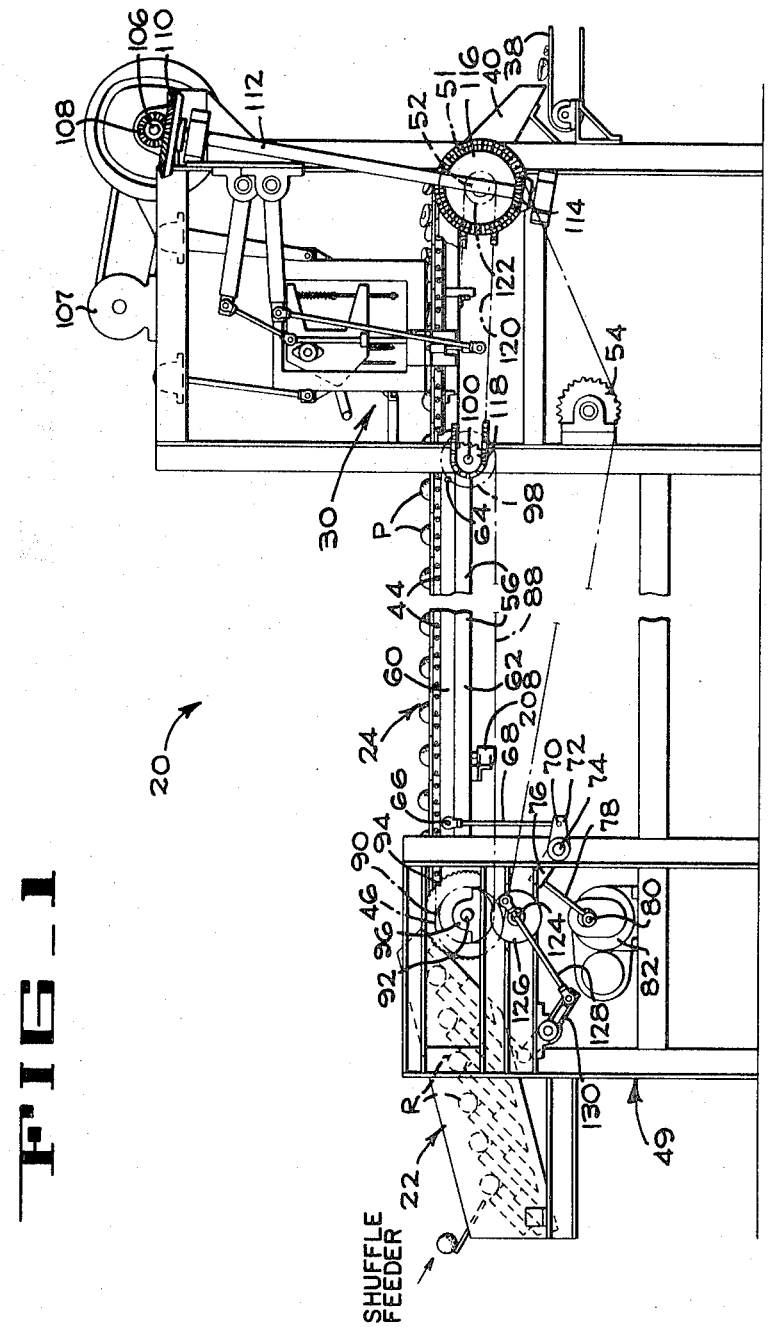

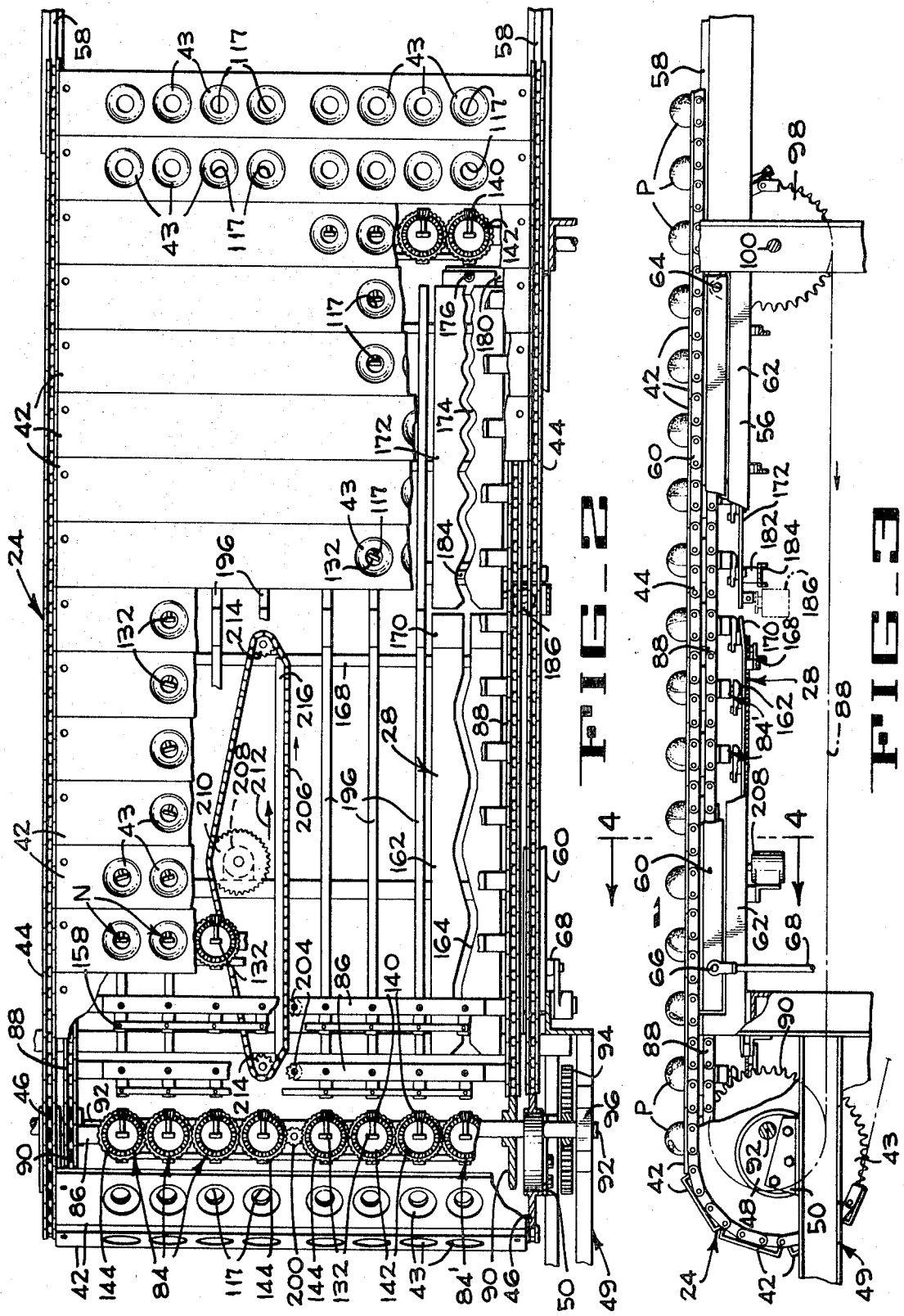

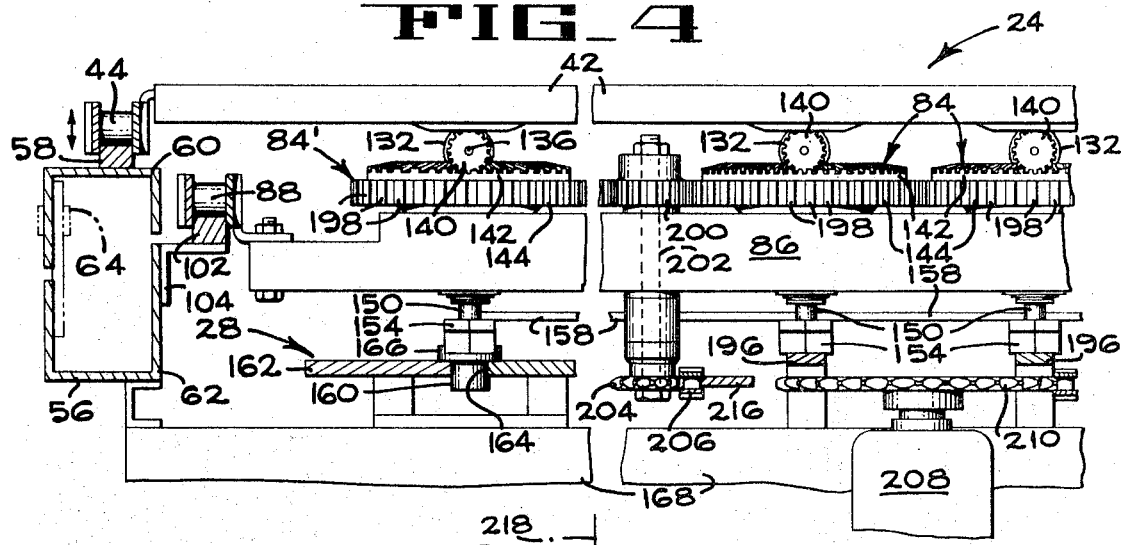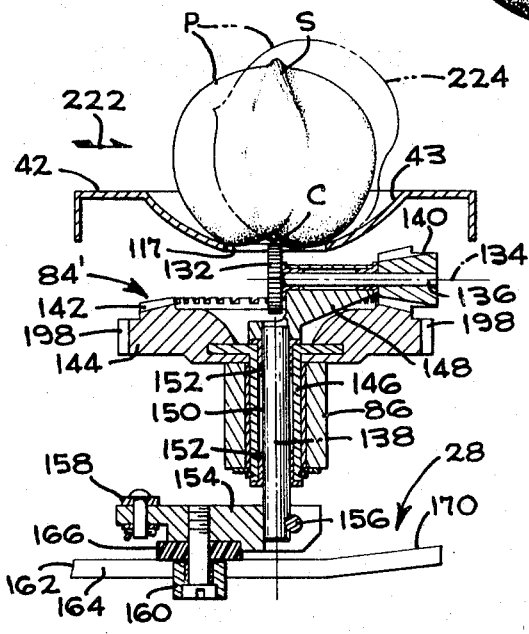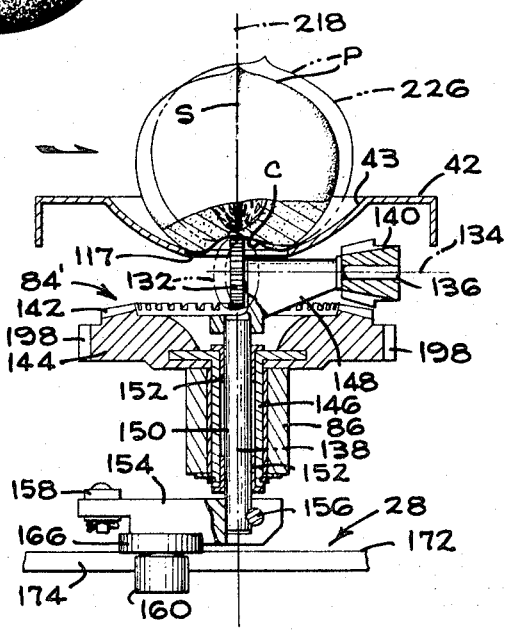

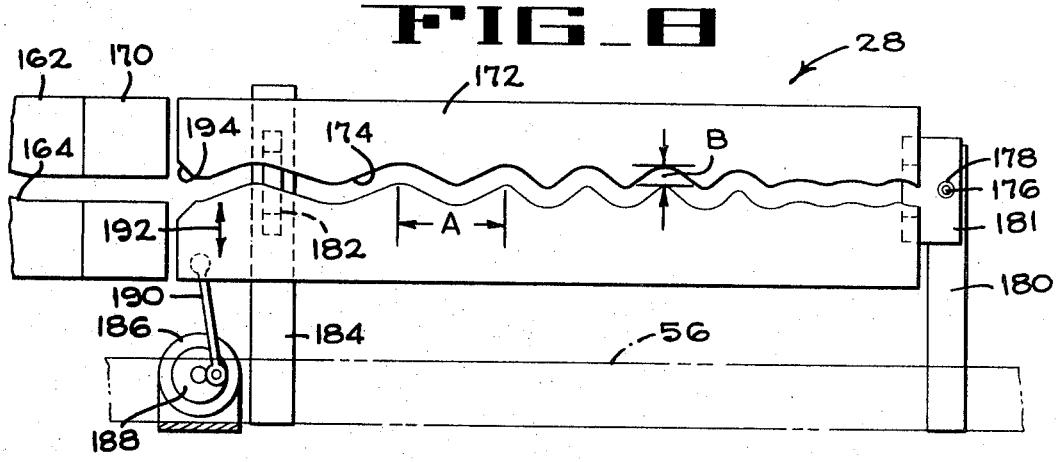
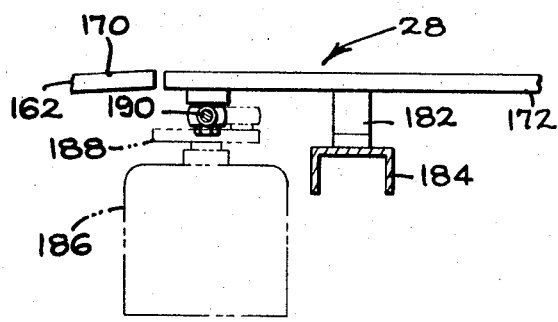
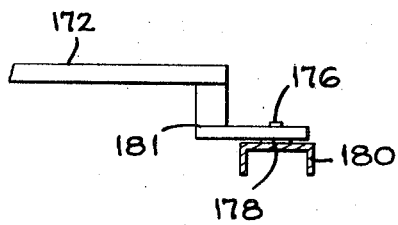
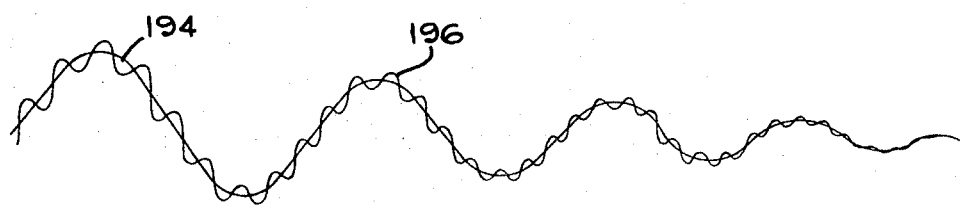

3,666,079

FRUIT ORIENTER

BACKGROUND OF THE INVENTION

1. Field of the Invention

The present invention generally pertains to apparatus for orienting the fruit that employs finder wheels and for finding the stem cavity of the fruit and aligning the suture plane. Particularly the invention relates to an aligner in which multiple lanes of fruit are simultaneously oriented and an improved finder wheel motion that produces more accurate and effective fruit orientation.

2. Description of the Prior Art

Keesling U.S. Pat. No. 2,918,098 describes a single lane fruit orienter that employs a stationary cam having an undulating cam track. In the end portion of the cam track the finder wheel is slightly raised to disconnect the finder wheel drive and the peach retaining cups exert a downward force against the finder wheel. Upon leaving the undulating cam the finder wheel is subjected to a pivoted, laterally vibrating, straight track section (FIG. 20) to more accurately sink the finder wheel in the stem cavity in instances where bumps or projections in the cavity have prevented complete alignment with the plane of the finder wheel.

The fruit handling machine described by Boyce et al. in U.S. Pat. No. 3,003,610, employs a transversely, translatory vibrated shaker section in a straight section of a cam track 310, (FIG. 2B) to cause settling of the peach stem cavity on the finder wheel.

SUMMARY OF THE INVENTION

The purpose of the present invention is to provide a higher capacity and more accurate orienter for seamed indented fruit. The fruit is oriented and retained in multiple lanes by a substantially more simplified cup conveyor than is presently known in the art. A series of carriages below the cup conveyor carry multiple aligner units that move in unison with the conveyor thereby operating to orient many pieces of fruit simultaneously.

A further object is to align fruit more rapidly and accurately. This is achieved by several features of the orienter. One feature is the vertical oscillation of the cup conveyor. This feature prevents a piece of fruit from being displaced to the side of the cup where the finder wheel is not effective.

Another feature is subjecting the fruit to an oscillation of the finder wheel which oscillation is comprised of two superimposed motions. One motion is produced by the undulations of the suture seeking cam track while the other is produced by vibrating the suture seeking cam. This particular oscillation causes both more rapid and more accurate orientation of the suture plane of the fruit.

DESCRIPTION OF THE DRAWINGS

FIG. 1 is a side elevation of a fruit processing machine employing the orienter of the present invention.

FIG. 2 is a partial plan view of the conveyor and fruit orienter having portions broken away.

FIG. 3 is a side elevation of FIG. 2 having portions broken away.

FIG. 4 is a partial cross-section of FIG. 3 taken on line 4—4 illustrating the fruit orienting drive mechanism.

FIG. 5 is a perspective view of a peach showing the stem cavity.

FIG. 6 is an enlarged side elevation of a fruit aligning unit in the indent seeking mode.

FIG. 7 is a view similar to FIG. 6 where the aligning unit is in the suture plane seeking mode.

FIG. 8 is a plan view of the oscillating cam.

FIG. 9 is an enlarged side elevation of the rearward portion of the oscillating cam.

FIG. 10 is an enlarged side elevation of the cam pivot mounting.

FIG. 11 is an exemplary view illustrating the motions produced by the oscillating cam track and the superimposed vibration.

DESCRIPTION OF THE INVENTION

The fruit orienter of the present invention may be employed with a peach pitting machine 20 such as seen in FIG. 1. The pitting machine has a shuffle feeder 22 that receives peaches and supplies them in transverse rows R to a continuously moving cup conveyor 24. Since the purpose of the cup conveyor 24 is to convey the peaches to a pitting head that requires the peaches to be oriented with the stem blossom axis vertical and the suture plane of the fruit transverse to the direction of motion of the cup conveyor 24 an orienter 28 is mounted below the cup conveyor adjacent its peach receiving end.

After having been oriented the peaches are presented to a longitudinally reciprocating pitting head indicated generally at 30. The pitting head is employed to sever and separate the peach into halves while removing the pit or stone. For further description of the pitting head and its operation reference may be made to a copending pitting machine application of Anderson Ser. No. 61,210, filed Aug. 6, 1970, now U.S. Pat. No. 3,524,180. After pitting the resulting peach halves and separated pits are carried to the forward or discharge end of the cup conveyor 24 and are delivered to a take-away conveyor 38 for further processing by chute 40.

THE CUP CONVEYOR

The cup conveyor 24 as seen in FIGS. 2, 3 and 4 is comprised of multiple transverse flights 42 in which peach receiving cups 43 are formed. Each flight 42 is mounted between a pair of conveyor side chains 44. At the receiving end of the conveyor, the chains 44 are supported on idler sprockets 46. As best seen in FIG. 3, the idler sprockets 46 are rotatably supported on large stationary hubs 48 (only one being shown) that are in turn mounted on the frame 49 by means of brackets 50 (only one being shown). Referring to FIG. 1, the forward portion or discharge end of the cup conveyor 24 is trained over a pair of driving sprockets 51 (only one being shown) attached to a head shaft 52 supported from the frame. A pair of idler sprockets 54 (only one being shown) adjustably mounted on the frame serve to guide and tension of the return run of the cup conveyor.

The side chains 44 of the upper run of the conveyor 24 extending between the shuffle feeder 22 and the pitting head 30 are further supported on horizontal box beams 56 that form part of the frame 49. Referring to FIGS. 2 through 4 it can be seen that the side chains 44 are guided and slide on ways 58.

In order to permit vertical oscillation of the conveyor in the area where the orienter is effective, each box section 56 is split into upper and lower sections 60 and 62 (FIGS. 3 and 4). The aforementioned sections are pivotally joined in front by means of pins 64, the lower sections 62 forming a fixed portion of the frame. The rearward ends of the upper box sections 60 are pivoted at 66 to vertically reciprocating links 68. The lower end of the links 68 are pinned at 70 to an oscillating crank 72 as seen in FIG. 1. It is to be noted that there is an oscillating crank on each side of the conveyor (only one side being shown) mounted at each end of a rock shaft 74. The rock shaft, in turn, is oscillated by a crank arm 76 pivotally connected to a connecting rod 78. The other end of the connecting rod is pivoted to an eccentric 80 driven by an oscillatory motor 82. When the motor 82 is driven the eccentric 80 rotates at several hundred cycles per minute thereby imparting a short, rapid, vertical vibration to the conveyor flights supported by the upper box sections 60. This vibration is employed to assist in the indent and suture plane finding operations in orienting to be described later.

ORIENTER

In order to achieve maximum effectiveness of the pitting head and produce pitted fruit halves of the best quality it is most desirable to separate the peach halves along their suture plane. The orienter 28 employed in the peach pitter of the present invention accomplishes orientation of multiple longitudinal rows of peaches while the cup conveyor 24 advances at a uniform velocity. The orienter 28 is located directly below the upper run of the conveyor 24 (FIGS. 1, 3, and 4) and includes multiple aligner units 84 mounted in carriages 86 that extend transversely between aligner side chains 88. As best seen in FIGS. 2 and 3, the side chains 88 at the rear of the orienter are trained about sprockets 90 secured to a transverse tail shaft 92. The tail shaft extends through and is rotatably supported in the stationary hub 48, thereby also permitting mounting of a gear 94 for driving the shuffle feeder 22. A pillow block 96 (FIG. 2) on the frame further supports the end of the tail shaft 92.

At the forward end of the orienter 28, the side chains 88 are trained about head sprockets 98 (only one being shown) that are attached to a cross shaft 100 rotatably mounted on the frame. Intermediate the orienter tail and head sprockets, the side chains 88 are supported and guided by ways 102 (only one being shown in FIG. 4). It is to be noted that these ways are attached to the lower fixed sections 62 of the box beam 56 by means of angle brackets 104 so that the orienter is not vertically oscillated as is the cup conveyor 24.

CONVEYOR DRIVE

Referring to FIG. 1, the drive for the reciprocating pitting head 30 and for the cup conveyor 24 is taken from a main cross shaft 106. This shaft is driven through a motor gear reduction 107 as disclosed in United States patent to Anderson et al. U.S. Pat. No. 3,310,084, issued Mar. 21, 1967. The cup conveyor 24 must be synchronized with the pitting head 30, as will later be described in detail, and therefore is also driven from the main shaft 106. In the illustrated construction, a bevel pinion 108 on shaft 106 drives a bevel gear 110 on a vertical shaft 112. At the lower end of shaft 112, a bevel pinion 114 drives a bevel gear 116 on the head shaft 52 for the cup conveyor. The cup conveyor side chains 44 pass over drive sprockets 51 on the shaft 52.

ORIENTER DRIVE

In order for the aligner units 84 of the orienter 28 to effect orientation of the peaches P through the bottom apertures 117 of the cup conveyor, the cup conveyor 24 and orienter 28 must be synchronized. This is accomplished by providing a sprocket 118 (FIG. 1) on cross shaft 100 on which the head sprockets 98 (FIG. 3) of the orienter 28 are mounted. A chain 120 is trained around the sprocket 118 and engages a similar sprocket 122 (shown in phantom line in FIG. 1) secured to the head shaft 52 of the cup conveyor.

SHUFFLE FEEDER DRIVE

The shuffle feeder 22 is synchronized with both the cup conveyor 24 and orienter 28. The shuffle feeder is driven by means of the gear 94 secured to the orienter tail shaft 92. The gear 94 drives a pinion not seen in FIG. 1 on a cross shaft 124 that operates a crank disc 126 pinned to a feeder link 128. Link 128 oscillates a feeder crank lever 130 for operating the shuffle feeder as described in the U.S. Pat. No. 3,088,577 to Chamberlin, the details of which are not important to the present invention. With this feeder randomly supplied peaches are presented row by row to the rows of conveyor cups 43.

ALIGNER UNITS

Each of the carriages 86 of the orienter mount multiple adjacent aligner units 84 as seen in FIG. 4. Each of these units has a finder wheel 132 that projects up into the cups 43 through the apertures 117 in the conveyor flight 42, as seen in FIGS. 6 and 7. This finder wheel is subjected to two different motions to accomplish orientation of the peaches P. The finder wheel 132 is rotated about a horizontal axis 134 coinciding with its mounting shaft 136. A second motion imparted to the finder wheel is an oscillation about a vertical axis indicated at 138.

Rotation of the finder wheel 132 is produced by a bevel pinion 140 mounted on the other end of the wheel shaft 136 and meshes with bevel teeth 142 on the upper surface of a drive gear 144. The drive gear rests on the upper surface of the carriage 86 and includes a vertical sleeve 146 rotatably mounted in the carriage. The finder wheel 132, shaft 136 and the pinion 140 are supported by a wheel post 147 that includes a wheel arm 148 (FIGS. 6 and 7) that in turn is attached to one end of a vertical central shaft 150 mounted for rotational and vertical sliding movement inside the drive gear sleeve 146 by means of bearings 152.

A cam arm 154 is pinned to the lower portion of the central shaft 150 by means of a pin 156 to control the oscillation of the central shaft 150 and wheel arm 148 about the central axis 138 and also to effect raising and lowering of the wheel arm to engage and disengage the pinion 140 while varying the amount of projection of the finder wheel 132 into the cup through the aperture 117. The cam arms 154 of the aligner units mounted on each carriage 86 are interconnected by means of a pinned connecting strap 158 such that all the finder wheels will be oscillated together in unison.

One of the finder units 84 is employed as a master unit as indicated at 84' and in the present embodiment is the left most aligner unit mounted on each carriage 86 when looking toward the shuffle feeder as seen in FIG. 6. The master aligner unit 84' differs from the remaining aligner units 84 in that a cam roller 160 is mounted in the bottom of the cam arm 154 and projects downwardly for engagement with indent seeking cam 162 having a cam track 164. Additionally a glide pad 166 is mounted between the cam roller 160 and the cam arm 154 to provide low friction contact between the upper surface of the cam 162 and the cam arm 154. The cam 162 (FIG. 4) is supported from the box frame section 56 by means of support brackets generally indicated at 168.

FINDER WHEEL OSCILLATION

Oscillation of the finder wheel 132 about the vertical axis 138 is produced by the action of the cam roller 160 and the cam track 164 as the aligner units 84 move forwardly in unison with the cup conveyor 24. The path of the cam track 164 is best seen in FIG. 2. Upon entering the indent seeking cam track, the roller produces a relatively slow constant frequency and amplitude oscillation of the finder wheel through an arc of approximately 90°; 45° to either side of a nominally transverse position of the wheel indicated at N in FIG. 2. Located at the forward end of the indent seeking portion of the cam track 164 is a ramp section 170. This section of the cam 162 can be also seen in FIG. 6. From the ramp section 170 the cam roller passes into a suture seeking section cam 172 having a track 174 where the cam arm 154 is maintained in raised position thereby disengaging pinion 140 from the drive gear 144 and raising the finder wheel 132 further up into the cup 26 raising the finder wheel into a suture seeking position to be further described in the peach orienting operation.

SUTURE SEEKING CAM

As best seen in FIG. 8, the suture seeking cam indicated at 172 has a non-uniform path or track 174 having a length of 35 inches. The irregular path or cam track 174 is best described as having an increasing frequency A and a decreasing amplitude B of lateral displacement. The cup conveyor 24 and aligner units 84 advance at a rate of 300 inches per minute. Upon entering the suture seeking cam track 174, the cam roller 160 is subjected to an initial frequency of oscillation of approximately 22 cycles per minute at an amplitude of 0.613 inches. As the cam roller 160 moves along the track 174, the frequency increases to approximately 170 cycles per minute and the amplitude decreases to 0.051 inches.

The suture cam 172 is pivoted at its rearward end as indicated at 176 in FIGS. 8 and 10 by means of a bushing 178 bolted to a channel support 180 secured to the frame 49. An end bracket 181, that extends downwardly and rearwardly from the cam 172, is seated on the bushing 178 and provides a vertical clearance for the cam follower 160 that is engaged in the track 174.

The forward portion of the cam 172 is supported for lateral vibrating motion by means of a bracket 182 that depends from the cam and slidably engages a support channel 184 that extends inwardly from the frame 20.

Also located at the forward end of the suture seeking cam is an eccentric mechanism that comprises a motor 186, an eccentric drive 188 and a connector rod 190 pivotally connected between the eccentric drive 188 and the forward portion of the cam 172. It can be seen that when the motor 186 is driven the cam 172 will be subjected to a lateral vibration as indicated at arrow 192. In order to permit smooth passage of the cam follower 160 from the cam track 164 into the cam track 174 of the laterally oscillating suture seeking cam 172, a beveled entrance portion indicated at 194 is included in the cam track 174.

As was previously explained, the oscillating motion is transferred to the other cam arms of the finder units 84 located on a common carrier 86 by means of the pinned strap 158 (FIG. 2). However, this strap connection is not capable of vertically supporting the other cam arms 154 from the master unit. Therefore, multiple ways 196 are provided to vertically support the remaining cam arms 154. These ways are mounted on support brackets 168 and include the ramp section similar to section 170 of the cam 162 so that the cam arms 154 and hence the finder wheels 132 of the aligner units 84 are always at the same height as the master aligner unit 84'.

FINDER WHEEL ROTATION

When the cam arm 154 is in the lowered position of FIG. 6 it can be seen that rotation of the drive gear 144 will cause rotation of the finder wheel 132 about the horizontal axis 134 through pinion 140. The drive gear 144 further includes gear teeth around its periphery as indicated at 198. As seen in FIGS. 2, 4, and 6, the aligner units 84 are on a common carrier 86 and are mounted closely adjacent each other so that the peripheral gear teeth 198 of adjacent units mesh thereby providing a continuous gear train across each carrier 86.

This gear train is driven by means of a pinion 200 interposed between two of the drive gears 144. The pinion is secured to the upper end of a vertical drive shaft 202 that passes through the carrier 86 and is rotatably received therein.

A sprocket 204 is attached to the lower end of shaft 202 and engages the outside of a horizontal drive chain 206 driven by motor 208 through sprocket 210 in the direction of arrow 212 (FIG. 1). As chain 206 passes around idler sprockets 214 it is supported by an internal restraining guide 216 extending between idlers 214 to prevent deflection of the chain.

As each carrier 86 advances its sprocket 204 externally engages the forwardly driven chain 206 resulting in rotation of all of the finder wheels 132 through the previously described gear train. It is to be noted that the drive chain 206 is effective to drive the finder wheels 32 only during cavity or seeking mode corresponding to section 164 of the cam track 162.

THE PEACH ORIENTING OPERATION

The successive aligning operations on a single peach P in one of the cups 43 will now be described. A typical peach P is shown in FIG. 5 having an elliptical cavity C at the stem end of its stem blossom axis indicated at 218. The elliptical cavity C has a major axis 220 that coincides with the suture plane S of the peach.

In FIG. 6, the peach is shown in its cup 43 it being assumed that the cup conveyor flight 42, aligner unit 84' and its carriage 86 are at the start of the cavity seeking section 164 in the cam 162. The finder wheel 132 is being driven and projects slightly into the cup through aperture 117 thereby rotating the peach. As the cup conveyor flight 42 and aligner unit 84' advance together in the direction of arrow 222, the finder wheel is slowly oscillated about the vertical axis 138 through arcs of 45° to either side of the nominal position N of the finder wheel 132 as shown in FIG. 2 so that the peach is rotated in varying planes.

If the peach should be rolled to a position toward the side of the cup as indicated in phantom line at 224 (FIG. 6), the vertical vibration to which the conveyor flights 42 are subjected will urge the peach back to the center of the cup 26 and into driving engagement with the finder wheel 132. When the peach has been rolled into a position with its cavity C toward the bottom of the cup, as shown in solid line, the finder wheel 132 no longer engages the surface of the peach P. It is to be noted that the suture plane S of the peach is not necessarily in alignment with the finder wheel 132.

As the conveyor flight 42 and aligner unit 84' advances, the finder wheel 132 is raised to the suture finding position of FIG. 7 by means of the ramp section 170 where it is no longer rotated but only subjected to the rapid oscillating motion about the vertical axis 138. Raising of the finder wheel 132 raises the peach, as indicated at 226, when the suture plane S and the major axis 220 of the elliptical cavity C do not coincide with the plane of the finder wheel 132. The oscillating motion of the wheel 132 shifts the peach about its substantially vertical stem blossom axis 218 until the elliptical cavity C is aligned with the finder wheel 132 and the peach P settles thereon as indicated in solid line in FIG. 7.

Thereafter, the peach turns with the finder wheel 132, the oscillation of which is continuously decreasing, thereby further settling the peach.

The rotary shifting motions exerted on the peach by the finder wheel 132 are produced by the action of the cam follower 160 in the undulating cam track 174 and the lateral vibration exerted on the suture seeking cam 172. These motions are best illustrated in FIG. 11 where the undulating mode of increasing frequency A and decreasing amplitude B is indicated by path 194. Here the effect of the superimposed lateral vibration of the cam 172 can be seen as path 196 which represents the oscillation or rotation of the finder wheel 132. It is to be noted that the superimposed vibration has a constant frequency but decreasing amplitude. The frequency of vibration of the cam 172 may be in the range of 200–1,000 cycles per minute while the stroke may be varied from one-sixteenth to three-eighths of an inch.

The effect of the superimposed vibration improves the speed of the suture aligning action of the finder wheel 132 thereby significantly reducing the length of orienter required. However, the vibration produces a second and perhaps more important benefit in that the accuracy of suture plane alignment is substantially improved.

Upon reaching the end of the cam 162 the peaches P are oriented with their suture plane S transverse to the direction of the cup conveyor indicated by arrow 222. At the end of the orienter 28 (FIG. 3) the aligner units 84 turn downwardly around the head sprockets 98 and the aligned peaches resting in the cup conveyor 43 continue to the pitting head 30 for further processing.

Although the best mode contemplated for carrying out the present invention has been herein shown and described, it will be apparent that modification and variation may be made without departing from what is regarded to be the subject matter of the invention.

What we claim is:

1. An apparatus for orienting indented and sutured fruit comprising a conveyor, means for advancing said conveyor over a horizontal path, said conveyor having a plurality of apertured fruit restraining cups, wheel posts associated with said cups, a finder wheel on each post rotatable about a horizontal axis and positioned in the cup aperture, means for continuously advancing said wheel posts over a portion of said path, cam means for oscillating said wheel posts about a vertical axis as they advance; and means for superimposing a rotary vibration of said wheel posts on their oscillation as they advance, said superimposed rotary vibration being of a higher frequency than said oscillation, said rotary vibration having a progressively decreasing amplitude along said path.

2. Apparatus for orienting indented and sutured fruit comprising a frame, a horizontal path conveyor along said frame, a plurality of apertured fruit cups on said conveyor, vertical axis wheel posts for said cups, each post having an offset cam follower, a horizontal axis finder wheel on each post, a first track for oscillating said cam followers and hence said finder wheels about a vertical axis as they advance along said track, and means for rotating said oscillating finder wheels about their own axes as they pass along said first track for finding the fruit indent, means for raising said finder wheels and discontinuing their rotation while advancing said followers along a second track that oscillates the finder wheels and brings them parallel to said path for picking up the fruit indents and orienting their sutures; the improvement wherein said second track has a sinuous cam path for oscillating said vibrating followers and the finder wheels through initially large angles for picking up the fruit indents and orienting the fruit sutures as the followers move along said second track, and means for laterally vibrating said second track for assisting in said orientation, said finder wheel oscillations by the cam path being at a frequency that is substantially less than the frequency of said second track vibration.

3. The apparatus of claim 2, wherein the amplitude of said second track lateral vibration progressively decreases along said path.

4. The apparatus of claim 2, comprising a sub-frame pivotally mounted on said frame near the downstream end of said conveyor, means for supporting said cups on said sub-frame as they move along said path, and means for vertically vibrating said sub-frame about its pivotal mounting.

5. The apparatus of claim 4, wherein said conveyor comprises side chains trained over sprockets on said frame, said cups being connected across said side chains, the upper reaches of said side chains being supported on said sub-frame.

6. The apparatus of claim 2, wherein said cups are mounted in transverse rows, a cam follower on one finder wheel post in each row, cranks on the other wheel posts in each row, and links connecting the follower and cranks in each row of cups so that oscillation of one follower in each row oscillates the remaining finder wheel posts in that row.

7. Apparatus for orienting indented and sutured fruit comprising a horizontal path conveyor, a plurality of apertured fruit cups on said conveyor, vertical axis wheel posts for said cups, each post having an offset cam follower, a horizontal axis finder wheel on each post, a first track for oscillating said cam followers and hence said finder wheels about a vertical axis as they advance along said track, and means for rotating said oscillating finder wheels about their own axes as they pass along said first track for finding the fruit indents and bringing them to the bottom of the cups, means for advancing fruit orienters for said cups having offset followers along a second track that brings the orienters parallel to said path; the improvement wherein said second track has a sinuous cam path for oscillating said orienter followers and the orienters through initially large angles for again picking up the fruit indents and orienting the fruit sutures as the followers move along said second track, and means for laterally vibrating said second track for assisting in said orientation, said orienter oscillation by said cam path being at a frequency that is substantially less than the frequency of said second track vibration.

8. In a method for orienting indented and sutured fruit in a cup conveyor moving along a path, wherein the indents are found and brought to the bottom of the cups by rotating finder wheels that are oscillated about vertical axes, and the sutures are oriented by again picking up the indents and oscillating them about a vertical axis at a low frequency until the sutures are oriented. The improvement comprising superimposing on said low frequency oscillation a vibratory oscillation at a substantially higher frequency and progressively reducing the amplitude of said vibratory oscillation along said path.

9. A method for orienting sutured and indented fruit comprising the steps of locating the indentation of the fruit by supporting the fruit in a cup, rotating a finder wheel that projects into the cup about a horizontal and a vertical axis to rotate the fruit in varying planes, thereafter orienting the suture of the fruit by oscillating the finder wheel about a vertical axis, and superimposing a rotary vibration of said finder wheel on its oscillation, said superimposed rotary vibration being of a higher frequency than said oscillation, said finder wheel oscillation about the vertical axis having an increasing frequency and decreasing amplitude, and said rotary vibration having a decreasing amplitude during the orienting period.

\* \* \* \* \*

FO-1050
(5/69)

UNITED STATES PATENT OFFICE
CERTIFICATE OF CORRECTION

Patent No. 3,666,079   Dated May 30, 1972

Inventor(s) GERALD R. ANDERSON et al

It is certified that error appears in the above-identified patent and that said Letters Patent are hereby corrected as shown below:

Column 2, line 19, change "Aug. 6," to -- Aug. 5, --.

Column 6, line 35, change "mode" to -- motion --.

Signed and sealed this 31st day of October 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,666,079          Dated MAY 30, 1972

Inventor(s) GERALD R. ANDERSON ET AL

It is certified that error appears in the above-identified patent and that said Letters Patent are hereby corrected as shown below:

Column 2, line 20: change "3,524,180" to --3,695,322--.

Signed and Sealed this

Thirteenth Day of May 1980

[SEAL]

Attest:

SIDNEY A. DIAMOND

*Attesting Officer*          *Commissioner of Patents and Trademarks*